United States Patent [19]

McLeish et al.

[11] Patent Number: 5,127,976
[45] Date of Patent: Jul. 7, 1992

[54] METHOD OF MAKING A SCRUBBER GLOVE

[75] Inventors: Juliana McLeish; Rodney J. McLeish; Phillip McLeish, all of Killarney Vale, Australia

[73] Assignee: Tescona Pty. Limited, New South Wales, Australia

[21] Appl. No.: 414,731

[22] Filed: Sep. 27, 1989

Related U.S. Application Data

[62] Division of Ser. No. 166,851, filed as PCT/AU87/00010, Jan. 14, 1987, abandoned.

[30] Foreign Application Priority Data

Jan. 14, 1986 [AU] Australia ............... PH4184

[51] Int. Cl.⁵ .............................................. B29C 41/14
[52] U.S. Cl. ...................................... 156/242; 2/167; 2/168; 2/169; 15/227
[58] Field of Search ............... 156/242; 2/167, 168, 2/169; 15/227

[56] References Cited

U.S. PATENT DOCUMENTS

| D. 268,968 | 5/1983 | Sami | 15/227 X |
| 1,979,130 | 10/1934 | Wiley | 15/227 X |
| 2,722,706 | 11/1955 | Chopp | 15/227 |
| 4,597,108 | 7/1986 | Momose | 2/168 |
| 4,621,388 | 11/1986 | Ortolivo | 15/227 |

FOREIGN PATENT DOCUMENTS

| 2727280 | 12/1978 | Fed. Rep. of Germany | 15/227 |
| 6704835 | 10/1967 | Netherlands | 15/227 |

*Primary Examiner*—Caleb Weston
*Attorney, Agent, or Firm*—Townsend and Townsend

[57] ABSTRACT

A glove or mitten of rubber or plastics material having a cleaning article attached to at least the front finger area of said glove or mitten, together with a method of manufacture of said glove comprising the steps of: (a) dipping a former into a vat of latex rubber until the required thickness of rubber adheres to the former;(b) leaching the adhered rubber by dipping former with adhered rubber into a vat of aqueous halogen solution;(c) removing, inverting and replacing the glove or mitten on the former;(d) repeating step (b);(e) removing glove or mitten from the former and placing glove or mitten on a flat surface; and (f) bonding either a cleaning article or a secondary attaching means to at least the front finger area of said glove or mitten.

4 Claims, 3 Drawing Sheets

METHOD OF MAKING A SCRUBBER GLOVE

This is a continuation of application Ser. No. 07/166,851, filed as PCT/AU87/00010, Jan. 14, 1987, now abandoned.

The present invention relates to a novel glove or mitten for use in cleaning or polishing various surfaces.

In the workforce, gloves or mittens are used to protect the wearer's hands. Such gloves or mittens are commonly made from latex rubber or plastics material, and range in thickness from surgical gloves to heavy-duty mittens used in the petro-chemical industry.

A characteristic of latex rubber or plastic is that it becomes slippery when wet. Soap or detergent increase this slipperyness and, as a result, a rubber glove is less efficient as a cleaning tool than the wearer's own bare hands.

A cleaning or polishing article includes: a sponge, wash cloth, rag, scourer or brush, and may be used either on its own or impregnated with soap, disinfectant, oil, polish, wax or combinations thereof.

Often, when a cleaning job arises, either the gloves can be found or the cleaning article can be found, but seldom both.

The present invention seeks to substantially overcome these problems by providing, in a novel and inexpensive manner, a glove or mitten for use in cleaning or polishing various surfaces, which combines the protective nature or a glove or mitten with the abrasive nature of a cleaning article.

In one broad aspect of the present invention there is provided a glove or mitten having a cleaning article attached to at least the front finger area of said glove or mitten.

The glove or mitten is preferably made from latex rubber of at least 1 mm in thickness, and preferably is in the shape of a mitten.

Whilst the cleaning article is preferably attached directly to at least the front finger area of the glove or mitten by bonding thereto, it is perceived that a secondary attaching means, such as VELCRO (Trade Mark), or press studs or such like, may be bonded to at least the front finger area of the glove or mitten, and that the cleaning article be detachable from said secondary attaching means.

In a further aspect of the present invention, there is provided a method of manufacture of a glove or mitten comprising the steps of:

(a) dipping a former into a vat of latex rubber until the required thickness of rubber adheres to the former;
(b) leaching the adhered rubber by dipping former with adhered rubber into a vat of aqueous halogen solution;
(c) removing, inverting and replacing the glove or mitten on the former;
(d) repeating step (b);
(e) removing glove or mitten from the former and placing glove or mitten on a flat surface; and
(f) bonding either a cleaning article or a secondary attaching means to at least the front finger area of said glove or mitten.

Preferably, the halogen used in step (b) is bromine.

Preferably, bonding is achieved by applying a urethane resin to both the glove or mitten and the cleaning article or secondary attaching means.

The present invention will now be described in detail with reference to a preferred embodiment as illustrated in the attached drawings, in which.

Figure 1:
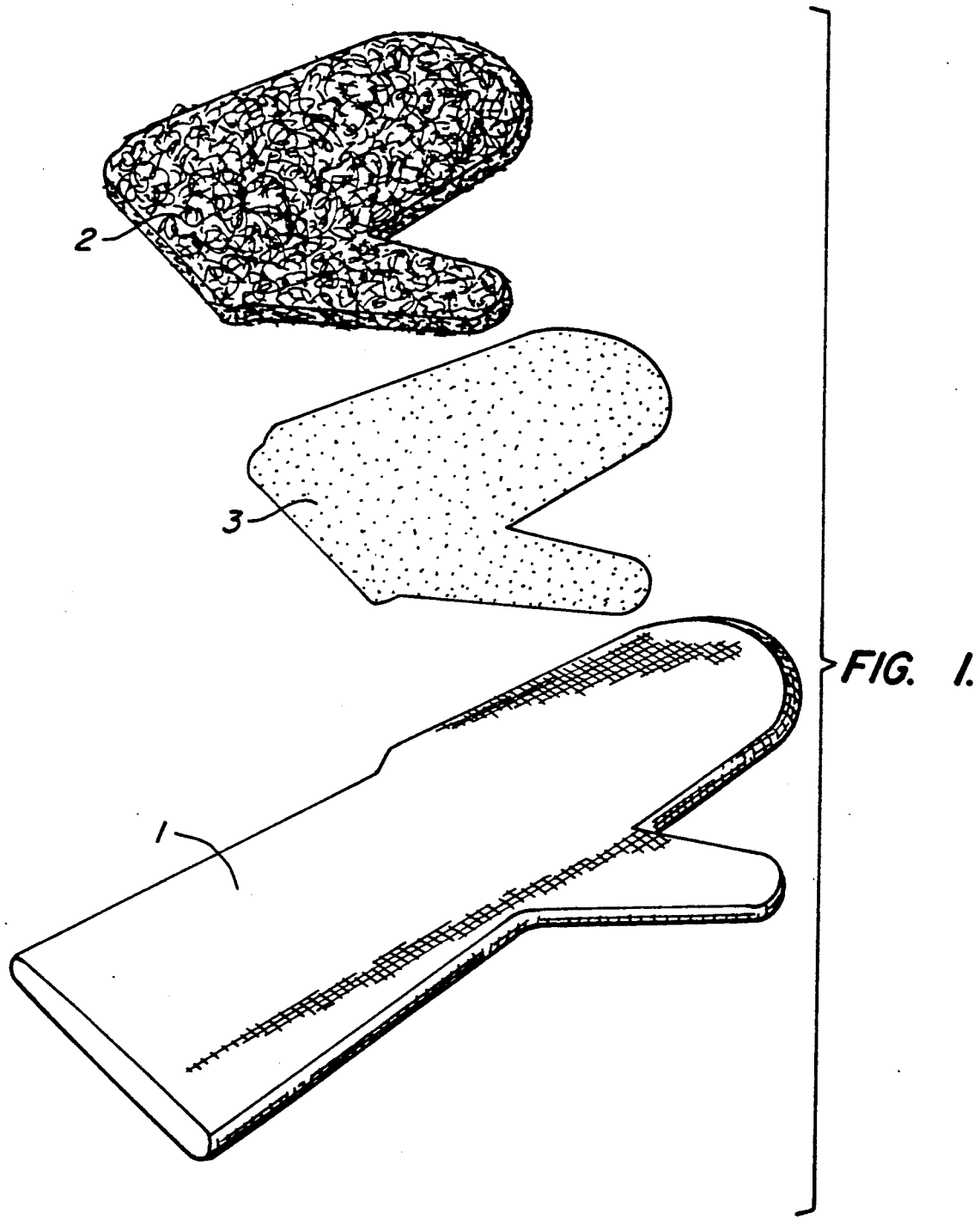
FIG. 1 is an exploded view showing a mitten, bonding agent and cleaning article.

In FIG. 1 there is shown in exploded view a mitten 1, which may be worn on either hand. The mitten 1 is of latex rubber and weighs between 25 and 30 g. A cleaning pad 2 of SCOTCHBRITE (Trade Mark), is cut to fit the area in front of the fingers and extending from the finger tips towards the wrist. This cleaning pad 2 is directly attached to the mitten 1 by a bonding agent 3 in the form of a layer of urethane resin 9521 (ICI) cross-linked with Delta Bond AR (ICI) applied to both the mitten and the cleaning pad, before the cleaning pad is pressed against the mitten.

Figure 2:
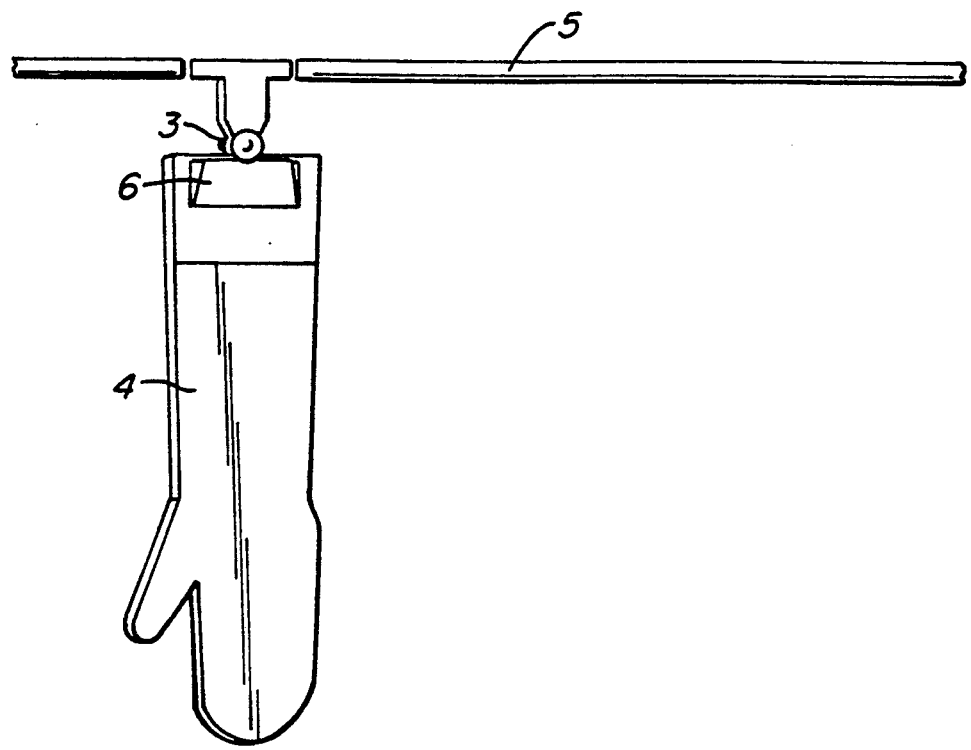
FIG. 2 is a schematic view of a method of manufacture of a mitten.
Figure 2:
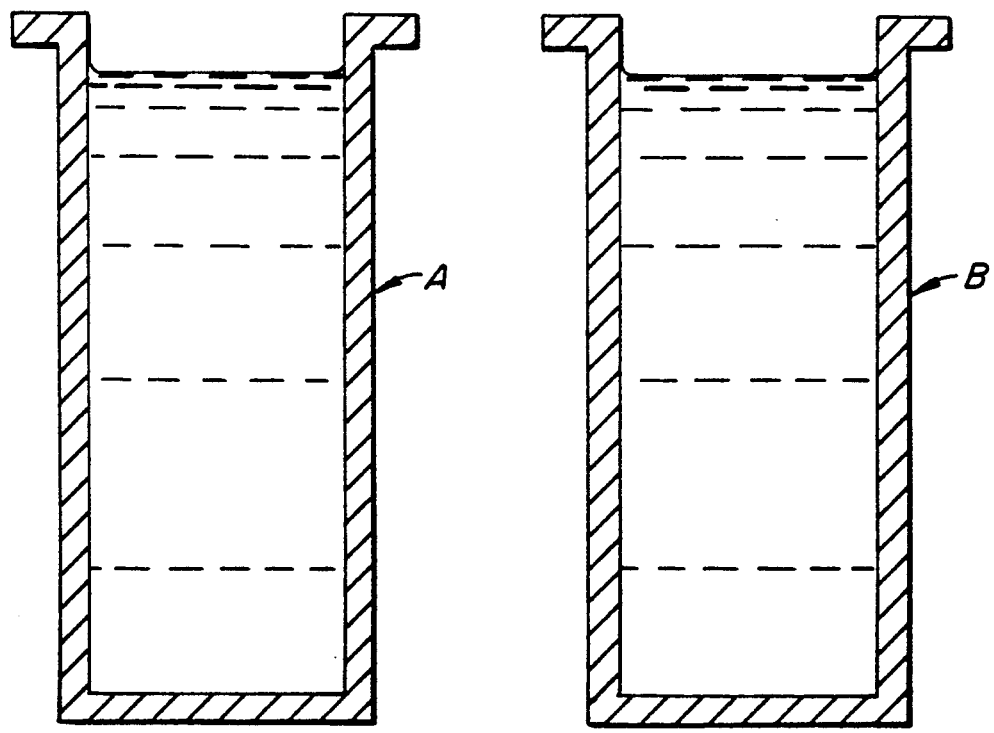
Figure 3:
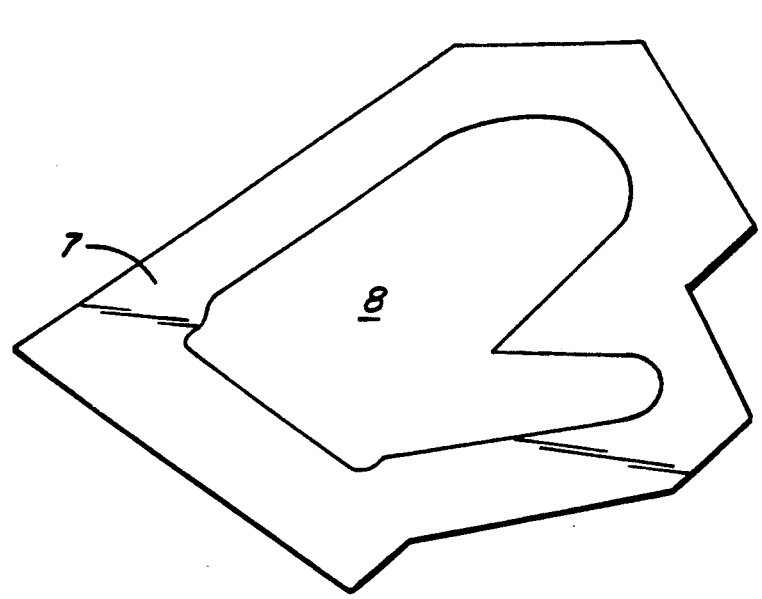
FIG. 3 is a schematic view of a method of bonding onto a mitten.
Figure 3:
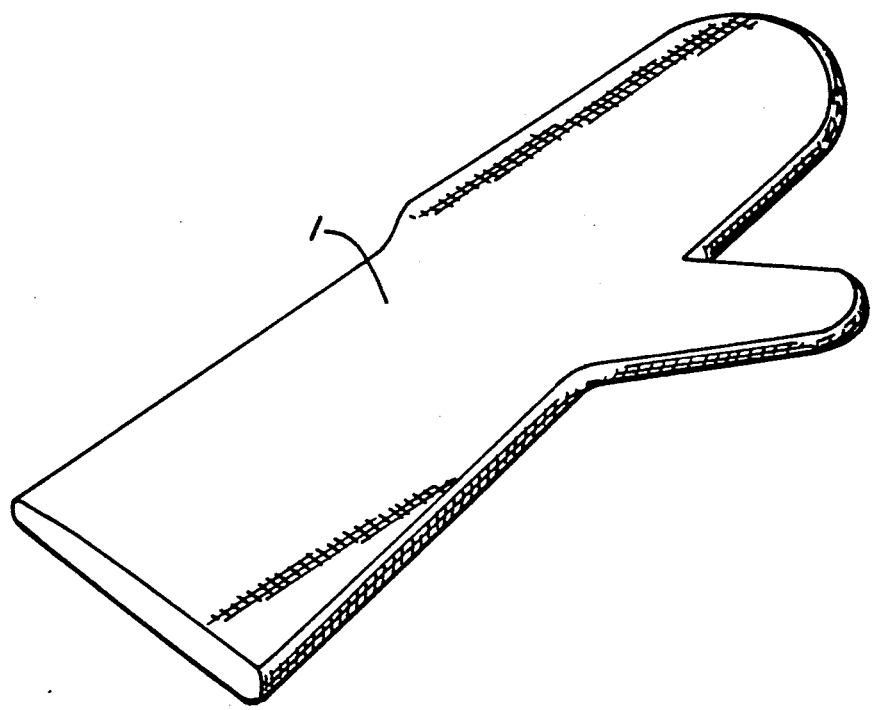

FIGS. 2 and 3 schematically illustrate a preferred method of manufacture of a mitten according to the present invention.

In FIG. 2, a flat former 4 is cut to the required shape from a sheet of aluminium. The former is first dipped in a solution of hydrochloric acid before use. A known platten assembly moves forward and backward along a rail 5 to allow the former 4 to be positioned above vats A or B. The former 4 is held on the platten assembly by means of a clamp 6.

Into vat A is placed an aqueous colloid of latex rubber to a depth of at least 360 mm. The former 4 is gently lowered into vat A to a depth of about 330 mm and allowed to remain in the vat A for about 1 minute, or until the latex rubber has adhered on the former 4 to a thickness of about 1 mm. The former 4 is then gently raised from the vat A and air dried at ambient temperature (20° C.) for about one hour.

The adhered rubber on the former 4 is then leached by lowering the former 4 into vat B which has earlier been filled to a depth of about 360 mm with a 5% aqueous bromine solution. The former 4 with the adhered rubber is agitated for between 1 and 2 minutes in the bromine solution before the former 4 is raised clear of vat B.

The bromine solution leaches (removes) antioxidants from the surface layer of the latex rubber and toughens the surface layer without affecting its flexibility.

The mitten is manually removed, inverted and replaced on the former 4 and the former 4 is once more dipped into vat B and agitated for 1 to 2 minutes to leach the inside surface of the mitten.

After raising the former 4 clear of vat B, the mitten is manually removed from the former 4 and, in doing so, the latex surface, which was first subjected to the leaching step, is once more the outside surface. However, as both the inside surface and outside surface of the mitten has been leached, it does not matter whether the mitten is again inverted before being placed on a flat surface.

In FIG. 3 the mitten 1 is placed on a flat surface and a template 7 is placed over the mitten 1, exposing only the area 8 between the fingertips and towards the wrist.

An even layer of urethane resin 9521 (ICI) cross-linked with 3.5% Delta Bond AR (ICI) is rolled over area 8 and allowed to become touch dry.

In a similar manner (not shown), an even layer of urethane resin 9521 (ICI) crosslinked with 3.5% Delta Bond AR (ICI) is applied to the underside of a SCOTCHBRITE (Trade Mark) pad 2 and allowed to become touch dry. The pad 2 is then brought into alignment with the area 8 on mitten 1 and pressed together until the bonding agent 3 cures. This curing normally takes about 30 minutes at ambient temperature (20° C.), although curing may be speeded up by heat curing the resin at 90°C.

It will be apparent to those skilled in the art that the present invention is of wide application in the field of cleaning and polishing, and that modifications, both in materials used, shape of the glove, mitten or cleaning article, or methods of curing, can be made without departing from the spirit and scope of the present invention.

We claim:

1. A method of manufacture of a cleaning glove or mitten of rubber material having a cleaning article attached to at least the front finger area of said glove or mitten, comprising the steps of:
    (a) coating a former with a layer of latex rubber of the required thickness;
    (b) leaching antioxidants from and toughening the surface of the adhered rubber without affecting flexibility of the adhered rubber using an aqueous halogen solution applied to the surface of the adhered rubber;
    (c) removing, inverting and replacing the glove or mitten on the former;
    (d) repeating step (b);
    (e) removing the glove or mitten from the former and placing the glove or mitten on a flat surface; and
    (f) bonding either a cleaning article or a secondary attaching means to at least the front finger area of said glove or mitten.

2. A method as claimed in claim 1, wherein the halogen used in step (b) is an aqueous solution of bromine.

3. A method as claimed in claim 1, wherein the cleaning article is selected from a sponge, wash cloth, rag, scourer pad or brush.

4. A method as claimed in claim 3, wherein the cleaning article is permanently bonded to at least the front finger area of said glove or mitten.

* * * * *